(12) United States Patent
Babaian et al.

(10) Patent No.: US 6,564,372 B1
(45) Date of Patent: May 13, 2003

(54) CRITICAL PATH OPTIMIZATION-UNZIPPING

(75) Inventors: Boris A. Babaian, Moscow (RU); Sergey K. Okunev, Moscow (RU); Vladimir Y. Volkonsky, Moscow (RU)

(73) Assignee: Elbrus International Limited, George Town Grand Cayman (KY)

( * ) Notice: Subject to any disclaimer, the term of this patent is extended or adjusted under 35 U.S.C. 154(b) by 0 days.

(21) Appl. No.: 09/504,630

(22) Filed: Feb. 15, 2000

Related U.S. Application Data

(60) Provisional application No. 60/120,395, filed on Feb. 17, 1999.

(51) Int. Cl.[7] .................................................. G06F 9/45
(52) U.S. Cl. ..................... 717/151; 717/150; 717/152; 717/140; 717/149
(58) Field of Search ................................. 717/151, 140, 717/150, 152, 153, 154, 155, 156, 157, 158, 159, 160, 149, 141

(56) References Cited

U.S. PATENT DOCUMENTS

| | | | | |
|---|---|---|---|---|
| 5,175,856 A | * | 12/1992 | Van Dyke et al. | 717/151 |
| 5,202,975 A | * | 4/1993 | Rasbold et al. | 717/141 |
| 5,367,651 A | * | 11/1994 | Smith et al. | 717/149 |
| 5,671,403 A | * | 9/1997 | Shekita et al. | 707/3 |
| 5,724,565 A | * | 3/1998 | Dubey et al. | 712/245 |
| 5,812,811 A | * | 9/1998 | Dubey et al. | 712/216 |
| 5,893,086 A | * | 4/1999 | Schmuck et al. | 707/1 |
| 5,937,195 A | * | 8/1999 | Ju et al. | 717/156 |
| 5,940,622 A | * | 8/1999 | Patel | 717/158 |
| 6,026,241 A | * | 2/2000 | Chow et al. | 717/152 |
| 6,044,221 A | * | 3/2000 | Gupta et al. | 717/151 |
| 6,151,706 A | * | 11/2000 | Lo et al. | 717/155 |
| 6,212,666 B1 | * | 4/2001 | Gohl et al. | 716/6 |
| 6,286,135 B1 | * | 9/2001 | Santhanam | 717/146 |
| 6,332,214 B1 | * | 12/2001 | Wu | 717/141 |
| 6,427,234 B1 | * | 7/2002 | Chambers et al. | 717/151 |

OTHER PUBLICATIONS

TITLE: Fast Effective Dynamic Compilation, author: Auslander et al, ACM, 1996.*
TITLE: A program form based on data dependency in predicated region, author: Ferrante et al, ACM, 1983.*
TITLE: Interprocedural Conditional Branch Elimination, author: Bodik et al, ACM, 1997.*
TITLE: Annotation–Directed Run–Time Specialization in C, author: Grant et al, ACM, 1997.*
TITLE: Two Step Approach to Optimize Parallel Execution of Multi join Queries, Publication Date: Mar. 1, 1992, IBM Technical Disclosure Bulletin.*
TITLE: Parallel Simulated Annealing Method for Highly Parallel Multiple Computer Processors, Publication Date: Dec. 1987, IBM Technical disclosure Bulletin.*
TITLE: On Parallelizing and Optimizing the Implementation of Communication Protocols, author: Leue, IEEE, 1996.*
TITLE: Static Single Assignment for Explicity Parallel Program, author: Srinivasan et al, ACM, 1993.*

* cited by examiner

*Primary Examiner*—Gregory Morse
*Assistant Examiner*—Chameli C. Das
(74) *Attorney, Agent, or Firm*—Townsend and Townsend and Crew LLP

(57) ABSTRACT

A method and apparatus for optimizing scheduling of a block of program instructions to remove a condition resolving instruction from the critical path where the resolution of a condition controls the selection between input results, generated by predecessor operations, by a merge operation which passes the selected result to a successor operation. In a preferred embodiment, the successor operation is "unzipped" by duplicating the successor operations, providing predecessor results directly to the, duplicated successor operations, and scheduling the duplicated successor operations prior to the merge.

7 Claims, 1 Drawing Sheet

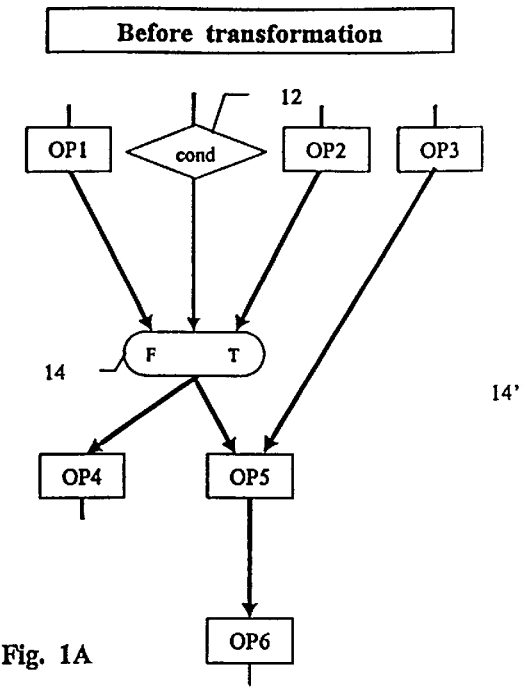
Fig. 1A
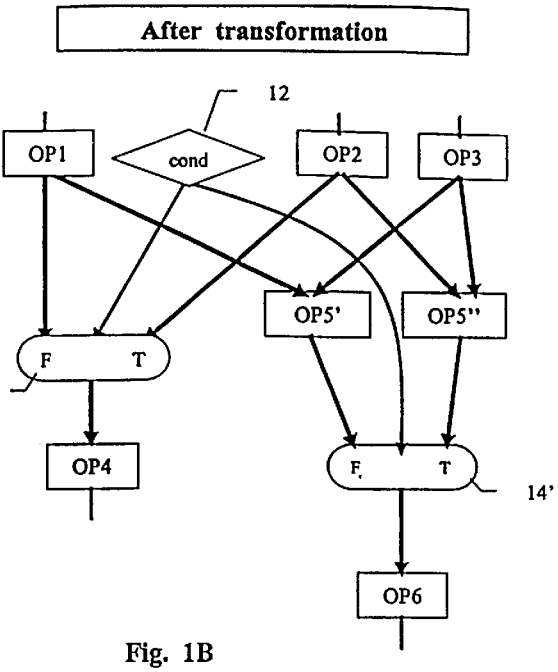
Fig. 1B
op1 – op5  - operations
 - condition operation
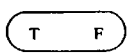 - merge operation

CRITICAL PATH OPTIMIZATION-UNZIPPING

CROSS-REFERENCES TO RELATED APPLICATIONS

This application claims priority from provisional Application No. 60/120,395, filed Feb. 17, 1999, the disclosure of which is incorporated herein by reference

BACKGROUND OF THE INVENTION

Compiler optimization has its goal transforming code to increase its performance. One important factor in optimization is scheduling operations to increase the speed of program execution by utilizing predicated and speculative operations. The present invention relates to optimizing code executed on an Explicit Parallel Instruction Computing (EPIC) architecture with full predication and speculation support and performs the global task of detecting and refining potential parallelism of the source code being compiled.

The present compiler transforms the source-code program represented as a set of Basic Blocks into Extended Scalar Blocks (ESBs) by applying a compiler technique called if-conversion. Extended Scalar Blocks are regions of the predicated code where all dependencies between operations are represented explicitly as a relation between two operations for a considerable number of operations. For each ESB the compiler works out the critical path, which is defined as a sequence of operations that will take the longest CPU time and cannot be executed in parallel because of dependencies.

SUMMARY OF THE INVENTION

According to one aspect of the present invention, a condition resolving instruction is removed from the critical path so that the path of longest execution time will be dependent on resolving a condition determined by other operations not on the critical path.

According to another aspect of the invention, the condition resolving instruction is followed by a merge operation which selects between input results based on the resolution of the condition (Boolean T or F). The merge outputs the selected result to a successor operation. An "unzipping" procedure duplicates the successor operation and schedules the duplicate successor operations prior to the merge. The input results are provided directly to the duplicate successor operations.

According to another aspect of the invention, the outputs of duplicate successor operations are provided as inputs to the merge. Thus, during execution the duplicate successor operations will be executed in parallel while the condition is being resolved. The outputs of duplicate successor operations will be ready when the condition is resolved and the merge will select between these outputs. The "unzipping" operation will remove the condition resolving instruction from the critical path if the combined time of execution of both the predecessor and successor operations exceeds the time of execution of the condition resolving instruction.

According to another aspect of the invention, in the case where a second successor operation, not on the critical path, receives an output from the merge, the merge is duplicated and scheduled in parallel with the duplicate successor operations. The output of the duplicate merge operation is provided to the second successor operation.

Another aspect of the invention is using critical path strategy on a predicated representation of a program based on speculative operation mode and full predicated operation mode and implementing optimizing transformations that take into account predicate dependences and data flow dependencies.

Other advantages and features of the invention will be apparent in view of the following detailed description and appended drawings.

BRIEF DESCRIPTION OF THE DRAWINGS

FIG. 1A depicts a scheduled block having a condition resolving instruction and a merge on the critical path; and FIG. 1B depicts a scheduled block after a successor to the merge operation has been "unzipped" according to an embodiment of the present invention.

DESCRIPTION OF THE SPECIFIC EMBODIMENTS

FIG. 1A depicts an example of compiler scheduling in the situation where the resolution of a condition is on the critical path. In FIG. 1A the critical path (shaded blocks) includes a condition resolving operation 12, a merge operation 14 which decides between its inputs based on the resolution (T or F) of the condition 12, an operation OP5, and an operation OP6. The merge operation 12 selects the result of either operation OP1 or operation OP2 and outputs the selected result to OP4 and OP5. The output of OP5 is received as input of OP6.

In this optimization method, a merge operation on the critical path is analysed and transformed. This pseudo merge operation (which may be a real operation in some target architectures with full predication) is added in a predicated intermediate representation to reflect control flow joining by using the operation predicate mode. This merge operation synchronizes outputs of two or more operations that write to the same register depending on a value of a corresponding predicate, with inputs of consumers of this register value at the point of merging control flow. Including such a merge operation in a program representation makes it possible to reflect in data flow form the points of merging control flow of the program, and to implement optimizations based on data flow and predicate dependences concurrently.

The pseudo-operation of merging data flow based on a condition cond1 can be denoted as:

MERGE cond1, $x1<t>$, $x2<f>\rightarrow res$, with res=x1, if cond1=true and res=x2, if cond1=false.

Thus, in FIG. 1A, the MERGE 14 provides the result of either OP1 or OP2 to both OP4 (not on critical path) and OP5 (on critical path). In addition, OP5 always uses the result of OP3. So OP5 cannot be executed until OP1, OP2, OP3, the condition, and the MERGE have completed. The execution time of the critical path (cp) is:

$T_{cp}=\max[(T_{OP1}+T_M), (T_{COND}+T_M), (T_{OP2}+T_M), T_{OP3}]+T_{OP5}+T_{OP6}$.

As long as $T_{COND}>T_{OP1}$ and $T_{COND}>T_{OP2}$, the result is:

$T_{cp}=T_{COND}+T_M+T_{OP5}+T_{OP6}$.

Unzipping, the result of which is shown in FIG. 1B, shortens the critical path by removing $T_{COND}$ from the execution time of the critical path. In FIG. 1A, the cond resolving operation 12, is followed by the merge 14, which is followed by OP5; that is, OP5 is the successor to merge 14 on the critical path. In FIG. 1B, OP 5 is "unzipped", i.e., OP5 is replaced by the modified merge operation 14' and the duplicate pair OP5' and OP5". The duplicate pair is scheduled ahead of the merge operation 14'.

Thus the "unzipping" is performed by changing the set of CPU instructions. First, OP5 is duplicated. The first copy (OP5') uses results of OP1 and OP3; the second copy (OP5") uses results of OP2 and OP3. Next, a merge 14' is scheduled that receives the results of OP5' and OP5" and selects a result based on the resolution of COND.

Taking advantage of the parallel processing ability of the EPIC architecture, OP5' and OP5" can be scheduled to execute in parallel, before it is known which result will be selected based on the resolved condition. Thus, instead of scheduling COND, then MERGE, then OP5, the operations COND, OP5', and OP5" can be scheduled to execute in parallel. In effect, the time at which the result of COND is required has been delayed. The new execution time is:

$$T_{cp}'=\max[(T_{OP1}+T_{OP5}), T_{COND}, (T_{OP2}+T_{OP5}), (T_{OP3}+T_{OP5})]+T_M+T_{OP6}.$$

For the case shown, the combination (OP2+OP5) is assumed to be the slowest so that:

$$T_{cp}'=T_{OP2}+T_{OP5}+T_M+T_{OP6},$$

which is smaller than $T_{cp}$ because $T_{COND}>T_{OP2}$. Note that even if $T_{COND}$ takes longer than any of the pairs, the result is:

$$T_{cp}'=T_{COND}+T_M+T_{OP6},$$

which is still less than $T_{cp}$. And in that case, the compiler could unzip again since COND on critical path is undesirable.

In FIG. 1B the merge 14 of FIG. 1A is duplicated with a first merge 14' being on the critical path and a second merge 14" receiving the results from OP1 and OP2 and passing a selected result to OP4. This duplication of merge operations is required when the merge 14 on the critical path also supplies a result to other successor operations that are not on the critical path.

In a preferred embodiment the optimization procedure is performed by a digital computer executing program code stored on a computer readable medium.

The invention has been described with reference to the preferred embodiments.

Alternatives and substitutions will now be apparent to persons of skill in the art. In particular, although the unzipping operation was described with reference to a single successor operation, plural successor operations may be unzipped. Accordingly, it is not intended to limit the invention excepts as provided by the appended claims.

What is claimed is:

1. A compiler optimization method for a computing system supporting parallel execution of operations, the method comprising:

identifying a critical path of a block of scheduled operations, the critical path including a condition resolving operation, a first merge operation that selects between respective results of two predecessor operations based on a result of the condition resolving operation, and a first successor operation that receives a result selected by the first merge operation;

scheduling two duplicate operations of the first successor operation for execution prior to the first merge operation, each of the two duplicate operations receiving a result from a respective one of the two predecessor operations;

modifying the first merge operation to select between respective results of the two duplicate operations based on the result of the condition resolving operation; and removing the first successor operation from the block of scheduled operations.

2. The method of claim 1 wherein the two duplicate operations are scheduled for execution in parallel with the condition resolving operation.

3. The method of claim 1 wherein the block of scheduled instructions further includes a second successor operation, not on the critical path, that receives the result selected by the first merge operation, the method further comprising:

scheduling a second merge operation prior to the modified first merge operation, the second merge operation selecting between the respective results of the two predecessor operations based on the result of the condition resolving operation; and modifying the second successor operation to receive the result selected by the second merge operation.

4. The method of claim 3 wherein the second merge operation is scheduled for execution in parallel with the two duplicate operations.

5. The method of claim 1 wherein the block of scheduled instructions is an extended scalar block.

6. A computer program product comprising:

a computer readable storage medium embodying computer program code thereon, the computer program code comprising:

computer program code for causing a computer to identify a critical path of a block of scheduled operations, the critical path including a condition resolving operation, a first merge operation that selects between respective results of two predecessor operations based on a result of the condition resolving operation, and a first successor operation that receives a result selected by the first merge operation;

computer program code for causing a computer to schedule two duplicate operations of the first successor operation for execution prior to the first merge operation, each of the two duplicate operations receiving a result from a respective one of the two predecessor operations;

computer program code for causing a computer to modify the first merge operation to select between respective results of the two duplicate operations based on the result of the condition resolving operation; and computer program code for causing a computer to remove the first successor operation from the block of scheduled operations.

7. The computer program product of claim 6 wherein the computer program code further causes the computer to schedule the two duplicate operations for execution in parallel with the condition resolving operation.

* * * * *